Figure 1:
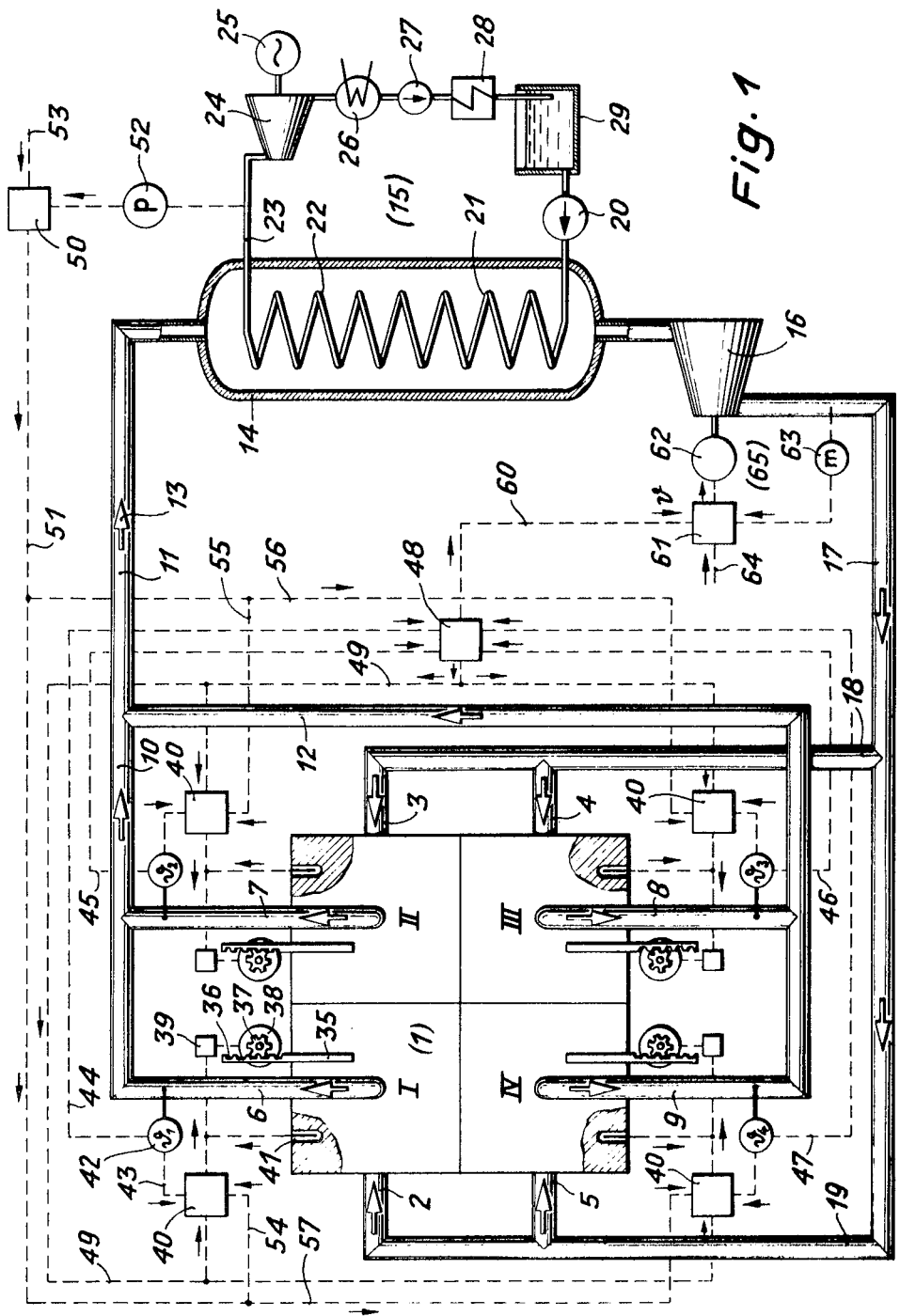

United States Patent

[11] 3,625,815

| [72] | Inventor | Ygal Fishman<br>Lausanne-Prilly, Switzerland |
|---|---|---|
| [21] | Appl. No. | 725,281 |
| [22] | Filed | Apr. 30, 1968 |
| [45] | Patented | Dec. 7, 1971 |
| [73] | Assignee | Sulzer Brothers, Ltd.<br>Winterthur, Switzerland |

[54] CONTROL SYSTEM FOR CONTROLLING A NUCLEAR REACTOR PLANT
9 Claims, 3 Drawing Figs.

[52] U.S. Cl. .................................................. 176/22, 176/24, 176/25
[51] Int. Cl. ........................................................ G21c 7/06
[50] Field of Search .......................................... 176/22, 20, 23, 24, 25, 36

[56] References Cited
UNITED STATES PATENTS
3,391,058   7/1968   Gilbert ........................ 176/22
FOREIGN PATENTS
845,207   8/1960   Great Britain ................ 176/36

Primary Examiner—Carl D. Quarforth
Assistant Examiner—Harvey E. Behrend
Attorney—Kenyon & Kenyon Reilly Carr & Chapin ABSTRACT: The control rods of the different zones of the plant are moved simultaneously with or independently of the control rods of the other zones. Control of the rod movements is made dependent on the pressure of the working medium of the plant as well as the outlet temperature of the reactor coolant. Additionally, a control of the live steam mass flow of the plant is achieved by comparison between the live steam mass flow and the overall neutron flux of the nuclear reactor.

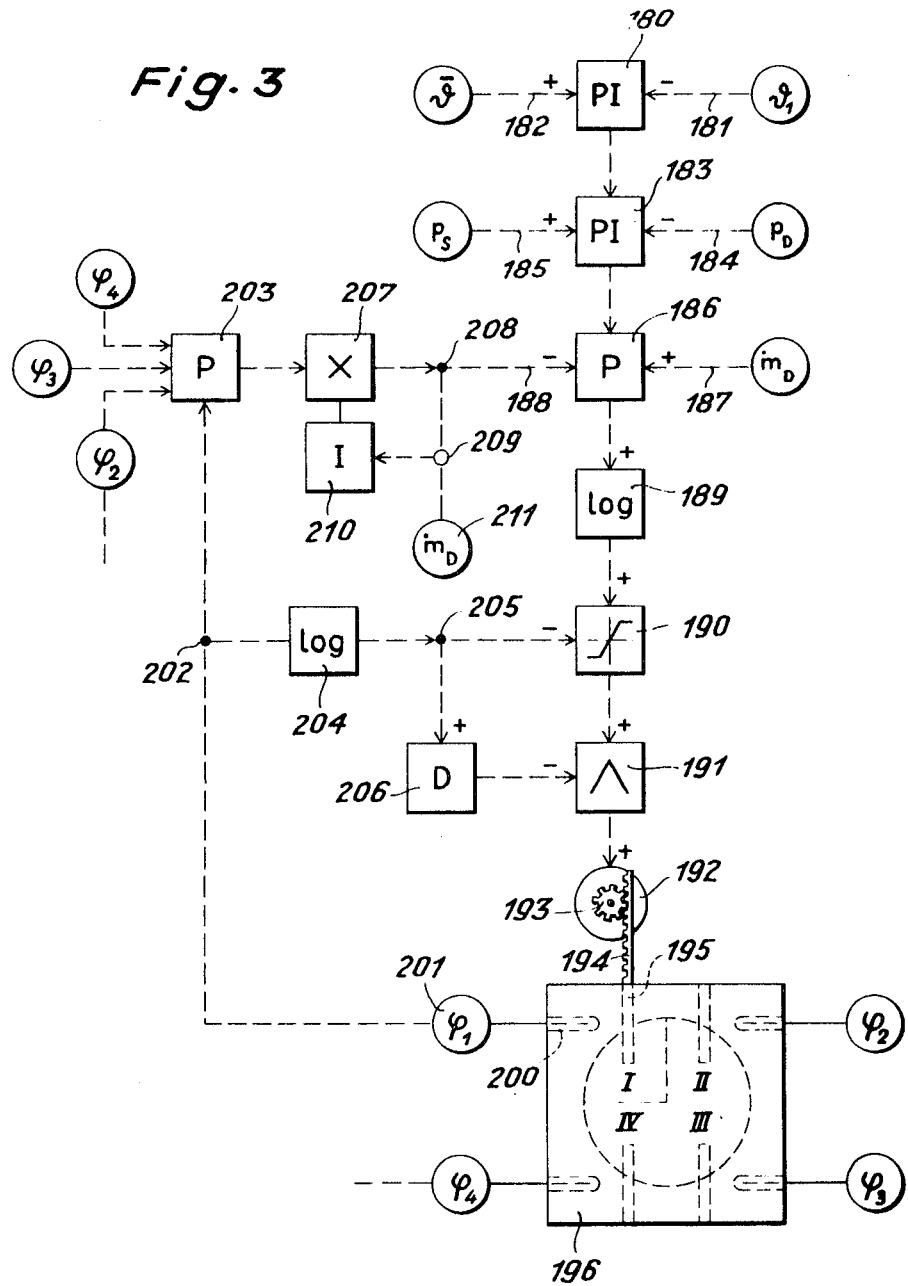

CONTROL SYSTEM FOR CONTROLLING A NUCLEAR REACTOR PLANT

This invention relates to a control system for controlling a nuclear power plant. More particularly, this invention relates to a control system for controlling a nuclear reactor plant by means of neutron-absorbing control rods arranged in zones and adjusted in accordance with the output of the plant.

In addition to the control rods provided for the control of the total output of a nuclear reactor which rods are affected by a mean temperature, for instance, the mean temperature of the hot coolant gas discharged by the nuclear reactor or by the mean neutron flux, it has been proposed to arrange a further set of control rods which are controlled in such a way that neutron flux asymmetry, caused for instance by xenon poisoning, and neutron flux oscillations resulting therefrom can be avoided.

Furthermore, it has been known as from Swiss Pat. No. 360,141 to arrange the control rods for the control of a nuclear reactor plant in substantially concentric circular zones, to move all the rods of any zone simultaneously as a function of the total output of the nuclear reactor and to sequentially raise these zones starting with the outermost zone and progressing inwardly, and sequentially lower these zones starting from the innermost zone and progressing outwardly.

However, these heretofore proposed control systems have required different sets of control rods with different control functions.

Accordingly, it is an object of the invention to eliminate the need for the juxtapositioning of control rods with different control functions.

It is another object of the invention to create a control system for a nuclear reactor plant which eliminates control rods having different control functions without being attended by any drawback with regard to control quality or neutron flux asymmetry.

Briefly, the invention is characterized by the fact that means are provided to measure the output of individual zones of a nuclear reactor and that control means are provided which, upon occurrence of a reactor total output error, cause an identical and simultaneous adjustment of the control rods of all zones and, upon occurrence of an error of individual zone outputs, cause an identical and simultaneous adjustment of the control rods of the zones in question.

The benefit of the invention resides in the fact that both for the control of the total output and for the correction of the asymmetry the customary control rods can be used. There is no need for any additional control rods with special control functions, e.g. for the control of xenon poisoning. The invention is particularly advantageous in the case of a large-size nuclear reactor in view of the fact that it can be reliably controlled in a simple manner and with uniform control means concerning the performance in its various areas. In view of the fact that certain elements of the control system perform two functions, the number of elements that rest for an extended period of time is reduced. As a result, a possible occurrence of trouble is noted more readily.

Figure 2:
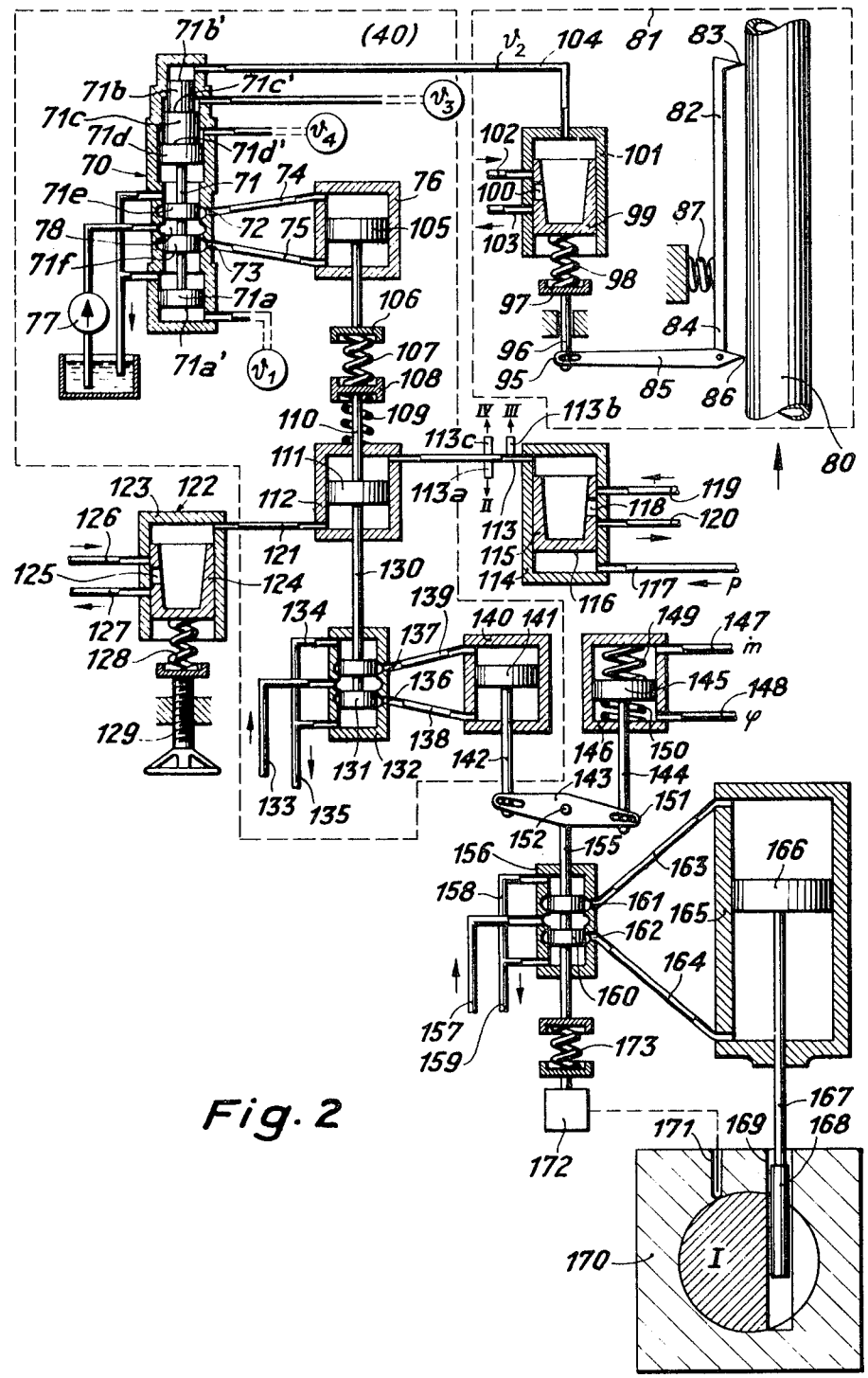

These and other objects and advantages of the invention will become more apparent from the following detailed description and appended claims taken in conjunction with the accompanying drawings in which:

FIG. 1 schematically illustrates an exemplified embodiment of a control system according to the invention;

FIG. 2 is a detail view of a part of another exemplified embodiment of the invention; and FIG. 3 schematically illustrates a part of another exemplified embodiment of the invention.

Referring to FIG. 1, the nuclear reactor 1 is subdivided into four zones I, II, III, IV, each of which is provided with an inlet-connecting branch 2, 3, 4, 5, respectively, and an outlet-connecting branch 6, 7, 8, and 9, respectively, for a coolant such as a gas. The coolant gas heated in the zones I and II leaves the nuclear reactor through the outlet-connecting branches 6 and 7, respectively, and passes through a line 10 into the common main 11. The coolant gas heated in the zones III and IV leaves the nuclear reactor through the outlet-connecting branches 8 and 9, respectively, and passes through the line 12 likewise into the common main 11. The hot coolant gas flow indicated by the arrow 13 passes through a heat exchanger 14 of a generating plant 15 and, following cooling off in the heat exchanger 14 is delivered by means of a circulating pump 16 over a distributor line 17, a line 18 and the inlet-connecting branches 3 and 4 to the zones II and III, respectively, and, over a line 19 and the inlet-connecting branches 2 and 5 to the zones I and IV of the nuclear reactor.

The heat exchanger 14 is supplied with water on its secondary side by a feed pump 20. This water is heated in a steam generator 21, evaporated and subsequently superheated in a superheater 22. The generated steam then passes over a live steam line 23 to a driving turbine 24 of an electric generator 25. The steam expanded in the turbine is precipitated in a condenser 26 and the condensate is supplied by means of a pump 27 over a tapped steam feed water heater 28 to a feed water tank 29 from which the feed pump 20 draws in water.

A set of control rods is assigned to each one of the zones I–IV of the nuclear reactor 1. For the sake of simplification, the drawing illustrates in each case only one control rod of each set. Each set of control rods is mounted on a rack mating with a pinion of an actuator. Thus, the set of control rods of the zone I represented by the control rod 35 is attached to a rack 36 mating with a pinion 37 of an actuator 38. The actuator is controlled by a controller 40 via an amplifier 39. The input values of the controller 40 are the outlet temperature $\theta_1$ of the coolant gas of the zone I, the mean value $\bar{\theta}$ of the four outlet temperatures $\theta_1, \theta_2, \theta_3, \theta_4$, of the coolant gas emerging from the zones I–IV, is well as a signal originating from a pressure regulator 50 connected to the live steam line 23. As a feedback value for the amplifier 39, a signal corresponding to the neutron flux density in the zone I as measured by means of a neutron monitor 41 is used. The signal is superimposed in such a way on the amplifier 39 of the zone I that, with increasing neutron flux, the control rods of this zone are lowered.

The outlet temperature $\theta_1$ of the coolant gas is measured in the outlet-connecting branch 6 of the zone I by means of a thermometer 42 and fed into the controller 40 over a signal line 43. The measurement values of the outlet temperature $\theta_1$, $\theta_2$, $_3$, $\theta_4$, of the four zones are supplied over signal lines 44, 45, 46 and 47 to an adding device 48 which forms therefrom in a known manner the mean outlet temperature value $\bar{\theta}$ of the coolant gas of the nuclear reactor. The mean temperature value $\bar{\theta}$ of the coolant gas is fed into the controller 40 of the zone I over a signal line 49.

The structure of the control system indicated above with regard to zone I is identical regarding the other zones II, III and IV.

The signal corresponding to the error of the live steam pressure $p$ in the live steam line 23 of the generating plant 15 is formed in a controller 50. The controller 50 is supplied, on the one hand, with the live steam pressure value $p$ in the live steam line 23 via a pressure transducer 52 and, on the other, with the desired value of the live steam pressure over a signal line 53. The output signal of controller 40 is supplied to the controllers 40 of the zones I, II, III and IV over a signal line 51 and its respective branch signal lines 54, 55, 56 and 57.

Besides being supplied to the controllers 40 of the four zones, the cooling gas mean temperature value $\bar{\theta}$ formed in the adding device 48 is also supplied over a signal line 60 to a temperature controller 61 controlling the drive motor 62 of the circulating pump 16. As a backfeed value, the temperature controller 61 is supplied with the signal of a mass flow meter 63 measuring the coolant gas amount $m$ delivered by the circulating pump and is also supplied over a signal line 64, with the desired temperature value for the mean temperature of the coolant gas discharged at the outlet-connecting branches 6, 7, 8 and 9 of the nuclear reactor. The controller 61 controls the drive motor of the circulating pump 16 in such a way that the mean temperature value $\bar{\theta}$ of the coolant gas leaving the zones is maintained constant, i.e. independent of the amount of steam taken from the steam generator 21 of the generating plant 15.

The control system of the plant operates as follows:

Upon occurrence of an error in the pressure $p$ of the live steam line 23 of the generating plant 15, the corresponding signal originating from the controller 50 is transmitted over the signal lines 51 and 54 to the controller 40 of the zone I to cause a displacement of the control rods 35 of the zone I via the amplifier 39 and the actuator 38. In the case of an excessive live steam pressure, the control rods are lowered and, in case the pressure is too low, the control rods are raised. The signal from the controller 50 is also transmitted via the signal lines 55, 56 and 57 to the controllers 40 of the other zones II, III and IV of the nuclear reactor so that similar displacements of the control rods occur simultaneously in the same direction as in zone I. Therefore, an error in the live steam pressure results in an identical and simultaneous adjustment of the control rods of all zones of the nuclear reactor, e.g. if the live steam pressure is excessive or too low, the overall output of the nuclear reactor, and hence the live steam pressure, is reduced or increased, respectively.

Upon the occurrence of an error of the coolant gas temperature in one outlet connecting branch of the nuclear reactor, for instance in the outlet-connecting branch 6 of the zone I, the controller 40 forms an error signal composed of the outlet temperature value $\theta_1$ and the mean value $\bar{\theta}$ (to be considered as a constant) formed in the adding device 48 from the four outlet temperatures $\theta_1$, $\theta_2$, $\theta_3$, $\theta_4$ of the four outlet-connecting branches 6, 7, 8 and 9. This error signal actuates the actuator 38 for the control rods 35 of the zone I over the amplifier 39. In this manner, in the case of an excessive outlet temperature $\theta_1$, the control rods of the zone I are lowered so that the neutron flux in this zone is reduced. As a result, the zone output is lowered and hence the temperature at the coolant gas of this zone is also lowered. In case the outlet temperature $\theta_1$ is too low, the control rods are raised thereby increasing the neutron flux of the zone I and causing the temperature of the coolant gas to rise. If an error of the outlet temperature of the coolant gas occurs in another zone, the control of the control rods is there similar to that described with regard to zone I and occurs independently of the latter. If errors in temperature occur simultaneously in two or more zones the control operations regarding these zones occur simultaneously and completely independently of one another.

It follows that the control system makes it possible to control the overall output of the nuclear reactor and to adjust the output of the various zones with respect to one another. In the preceding exemplified embodiment it is not the overall output as such that constitutes the control parameter but rather the pressure $p$ of the working medium of the power plant. This pressure represents an integrated balance parameter between the desired output value (the amount of steam required by the turbine) and the actual value of the amount of steam supplied. Therefore, the error with respect to the desired value is a quantity substantially proportional to the time integral of the output error with respect to the desired value. The use of a temperature signal as a measurement value for the output of the zone can be justified as follows. The control rods of a zone are to be adjusted proportional to the output N of this zone. As the desired value for the output of the zone, the mean value $\bar{N}$ of the zone output is used. The error $\Delta N_n$ of the output of the $n^{th}$ zone can be illustrated by the equation:

$$\Delta N_n = (\theta_n - \theta_e) \cdot c_p \cdot q_n - (\bar{\theta} - \theta_e) \cdot c_p \cdot \bar{q}$$

where $\theta_n$ = outlet temperature of the coolant of the $n^{th}$ zone
$\bar{\theta}$ = mean outlet temperature of the coolant gas
$\theta_e$ = input temperature of the coolant gas into the nuclear reactor
$q_n$ = coolant gas mass flow in the $n^{th}$ zone
$\bar{q}$ = mean coolant gas mass flow of the zones
$c_p$ = mean thermal capacity at constant pressure.

If it be assumed that the coolant gas mass flows of the zones are identical to one another and that $c_p$ is constant, it can be gathered from the equation that the error of the zone outlet temperature with respect to the mean outlet temperature $\bar{\theta}$ of the zones, multiplied by a load factor $q$, is directly proportional to the error of the output of the zone with respect to the mean output of the zone. In view of the fact that the xenon poisoning to be corrected involved processes that are extremely slow, the load factor $q$ may be neglected. Therefore, $\theta_n - \bar{\theta}$ approximates $\Delta N_n - \bar{N}$, which proves that the temperature signal of one zone is representative for the output of the zone.

It is noted that the nuclear reactor is schematically illustrated with four zones substantially in the form of a rectangular parallelepiped; however, it is to be understood that other zone configurations are possible. Thus, the zones may have the shape of a right-angled prism. The prism base may be a triangle, a polygon or even a circular sector. In the case of a cylindrical or ball-shaped configuration of the nuclear reactor, the zones will have the shape of cylindrical or ball sectors. The number of zones may also be greater than 4. Furthermore, the nuclear reactor may comprise two sets of zones arranged in tiered relationship and provided with their respective control rods. In such an arrangement the control rods of the upper zones can be inserted from the top and the control rods of the lower zones from the underside.

It is not necessary, as schematically illustrated in FIG. 1, that each zone of the nuclear reactor be provided with both an inlet and an outlet-connecting branch for the coolant. The connecting branches can be combined for a plurality of zones or else for all zones. In this way, it is possible to provide the nuclear reactor with only one inlet- and outlet-connecting branch common to all zones. In this case, the temperature of the coolant gas in the zones must be measured by means of a thermometer arranged at a suitable point inside each zone.

Referring to FIG. 2, a detail view of an example of the control system of a nuclear reactor power plant improved with respect to that of FIG. 1 is shown. For the sake of simplification, only the control means for the zone I of the nuclear reactor is illustrated, the control means for the zones II, III and IV are designed identically. The part of the control system framed by a dotted line and designated by the reference 40 corresponds to the controller 40 of FIG. 1. It comprises a pilot valve 70 or comparator determining the error between the outlet temperature mean value and the outlet temperature of the zone I. The pilot 70 comprises a servo piston 71 consisting of piston sections 71a, 71b, 71c and 71d. The temperature signal $\theta_2$, $\theta_3$, $\theta_4$ of the respective thermometers measuring the temperature of the coolant gas at the outlet-connecting branch of the zones II, III or IV acts on the effective areas 71b', 71c', 71d' of the piston sections 71b, c and 71d, respectively. In the opposite sense, the temperature signal $\theta_1$ of the thermometer at the outlet connection 80 for the coolant gas of the zone I acts on the effective 71a' or the piston section 71a. The effective The temperature signals $\theta_1$, $\theta_2$, $\theta_3$, $\theta_4$ are obtained by means of a temperature signal transmitter. The drawing shows the temperature signal transmitter 81 for forming the temperature signal $\theta_2$ of the zone II. The other zones have an identical temperature signal transmitter. On the outlet-connecting branch 80 for the coolant gas of the zone II, an invar rod 82 is anchored at one end at 83 whereas the other end 84 of the invar rod is pivotally connected with a lever 85. The end 86 of the lever is firmly pressed against the outlet-connecting branch in that the invar rod 82 is spring loaded by means of a spring 87. The movable end 95 of the lever 85 acts via a lever 96 with a spring plate 97 on a spring 98 bearing against a hydraulic bell 99 with a bore 100. The bell 99 slides in a cylinder 101 to which a pressure line 102 and a control oil sump line 103 are laterally connected. With increasing temperature of the coolant $\theta_2$ of the zone II, the outlet-connecting branch 80 is extended; however, the invar rod 82, having a very small expansion coefficient, is hardly changed. The lever 85 rotates clockwise around its end 86. The movable end 95 of the lever rises thereby intensifying the pressure of the spring 98 acting on the bell 99. As a result, the bell is upwardly displaced so that control oil will enter the bell under pressure via the pressure line 102 and the bore 100 and, as a result, the pressure in the bell will increase. Control oil will enter until the pressure in the bell is equivalent to the intensified pressure of the spring 98. The pressure in the bell, i.e. the temperature signal $\theta_2$, acts via a signal line 104 on the surface 71b' of the piston section 71d of the pilot 70.

The piston 105 of the actuator 76 compresses, via a spring plate 106, a spring 107 the lower end of which rests on a spring plate 108 supported in turn by a spring 109. The spring plate 108 is connected over a piston rod 110 with a piston 111 of a comparator 112. Over a line 113, a control oil pressure formed by a pressure transducer 14 and identical to the pressure $p$ in the generator plant live steam line (see 23, FIG. 1) acts onto the upper side of the piston 111. The pressure transducer 114 comprises a hydraulic bell 115, the bottom 116 of which is loaded with live steam over a line 117. A bore 118 in the bell 115 adjusts the orifices of a control oil pressure line 119 and a sump line 120 until the pressure at the bell 115 is in equilibrium. The resultant control oil pressure representing the pressure $p$ of the live steam acts over the line 113 on the piston 111 of the comparator 112. The control oil pressure of a live steam setting means 122 acts upon the underside of the piston 111 over a line 121. The setting means consist of a cylinder 123, a hydraulic bell 124 with a bore 125 which adjusts the control oil pressure line 126 and the control oil sump line 127 until a pressure equilibrium with the tension of a spring 128 is achieved at the bell 124. The preload of the spring, that is, the desired live steam pressure value is set by means of a setting screw 129.

The forces acting on the piston 111 of the comparator 112 and, over the spring 107, on the spring plate 108, displace the piston rod 110 until these forces are in equilibrium with the bias of the spring 109. The piston 111 is connected over a piston rod 130 with a servo piston 131 of a pilot 132 provided with a control oil pressure line 133 and two sump lines 134 and 135. The pilot 132 controls the orifices 136 and 137 of the lines 138 and 139, respectively, which are connected to an actuator 140. The actuator 140 comprises a piston 141, the piston rod 142 of which is connected over a compound lever 143 and a piston rod 144 with the piston 145 of a comparator 146. At the upper part of the piston 145, an oil pressure is present over line 147 which corresponds to the live steam mass flow $\dot{m}$ of the power plant and, on the underside of the piston, an oil pressure is present over a line 148 which corresponds to the actual value $\Phi$ of the overall neutron flux of the nuclear reactor. The resultant of the two pressures is balanced by a two-spring system 149 and 150; the position of the piston 145 thus forms a measurement for the difference of the two oil pressures. The piston rod 144 of the piston 145 is pivotally connected with the one end 151 of the compound lever 143. The fulcrum 152 of the compound lever 143 is connected with a piston rod 155 of a pilot 156.

The pilot 156 comprises a control oil pressure line 157 and two sump lines 158 and 159. The piston 160 of the pilot 156 controls the orifices 161, 162 of the lines 163 and 164, respectively, connected to a hydraulic actuator 165. The actuator 165 comprises a piston 166 whose piston rod 167 carried a neutron-absorbing control rod 168. The control rod 168 is representative for the entire assembly of control rods of the zone I. The control rod enters a bore 169 of the zone I of a nuclear reactor 170. The nuclear reactor is provided with a neutron monitor 171 measuring the neutron flux of the zone I and the output signal of which is transmitted to a transducer 172. The transducer bears a spring 173 which urges from the lower side a return of the piston rod 155 of the pilot 156.

The control means of the zones II, III and IV is identical to that described regarding zone I. The pressure transducer 114 which supplies the live steam pressure signal $p$ is common to all zones. The signal appearing at the line 113 is supplied over branch lines 113a, 113b, 113c to the comparators 112 (not shown) of the zones II, III and IV, respectively. The comparator 146 which compares the live steam mass flow of the power plant with the overall neutron flux of the nuclear reactor is provided for each zone. Each comparator 146 is connected to the line 147 for the live steam mass flow and to the line 148 for the overall neutron flux of the nuclear reactor, as illustrated in FIG. 2. The piston rod 144 of each comparator is connected with the pilot of each actuator of the respective zone control rod assemblies. It is naturally also possible to provide only one comparator 146 for all zones, whose piston rod 144 would in that case be connected, for instance mechanically, with the pilot of the actuator of each zone.

The control system described by FIG. 2 operates as follows:

If the live steam pressure in the live steam line rises above the desired value, i.e. the oil pressure rises in the line 113, the piston 111 of the comparator 112 is lowered, just as the piston 131 of the pilot 132, resulting in an ascent of the piston 141 as well as of the piston 160 of the pilot 156. Thus, control oil flows into the space above the piston 166 of the actuator 165 so that the control rod 168 of the zone I is lowered and the neutron flux in this zone reduced. As a result, the output of zone I decreases. This process occurs in identical manner and simultaneously in the control means of the other zones II, III and IV since, as described above, the signal line 113 of the pressure transducer 114 is connected with the four controllers 40 of all zones. As a result, the overall output of the nuclear reactor drops and the live steam pressure is reduced.

If the pressure of the live steam is lowered, oil flows into the space under the piston 166 of the actuator 165 so that the control rod 168 of the zone I is raised and the neutron flux and hence the output of the zone I increases. This process is likewise repeated in identical manner in the other zones, as explained above. As a result, the overall output of the nuclear reactor increases and the live steam pressure rises again.

Upon an increase in the temperature $\theta_1$ of the zone I of the nuclear reactor above the desired value without a simultaneously increase in the temperatures $\theta_2, \theta_3, \theta_4$ of the other zones II, III or IV, the pressure on the piston section 71a of the pilot 70 is greater than the total pressure on its piston sections 71b, 71c, 71d, so that the piston 71 will rise and, as a result, the piston 105 of the actuator 76 will move downward. Accordingly, the servo piston 131 of the pilot 132 is deflected downwardly whereupon the piston 141 in the actuator 140 rises and carries along in its upward movement the piston 160 of the pilot 156. Thus, pressure oil flows through the orifice 161 and the line 163 into the actuator 165 so that its piston 166 and the piston rod 167 are lowered. Accordingly, the control rod 168 of zone I is lowered and the neutron flux of this zone, i.e. its output, is reduced thus causing a drop in temperature of the coolant gas leaving this zone.

Upon lowering of the temperature $\theta_1$ below the desired value, the piston 166 of the actuator 165 rises thereby lifting the control rod 168 of the zone I and increasing the neutron flux of this zone. Thus, the temperature of the coolant gas leaving zone I is again raised.

If the turbine of the power plant is subjected to a greater load and thus a greater steam amount $\dot{m}$ is drawn from the steam generator so that the pressure in the signal line 147 increases, there occurs a lowering of the piston 145 of the comparator 146 and of the piston 160 of the pilot 156 so that the actuator 165 will lift the control rod 168 and the output of the reactor increases in the zone I. The same process occurs in the other zones II, III and IV under the influence of the respective comparators 146. Accordingly, the overall output of the nuclear reactor increases until it can sustain the required steam demand. This adjustment presents a coarse control of the control rods. The fine correction of the reactor output takes place in the manner described above through the effect of the steam pressure on the comparator 112.

If a change of the live steam mass flow occurs simultaneously with an equivalent change in the overall neutron flux, that is, if an increase (or decrease) of the live steam mass flow is accompanied by an equivalent rise (or drop) of the overall neutron flux, then no adjustment of the control rods is to occur. Such an adjustment does not occur because, in such a case, the oil pressure at either side of the piston 145 of the comparator 146 is identical and its position remains unchanged. Therefore, there is no adjustment of the control rods. Also in this case, this holds true for the control rods of all zones.

By comparison with the control system of FIG. 1, the control system according to FIG. 2 represents an improvement in that it makes possible a control of the live steam mass flow of the power plant and a comparison between this mass flow and the overall neutron flux of the nuclear reactor.

FIG. 3 schematically illustrates another embodiment of the control system by way of example of one single zone, namely zone I. A proportional integral member (PI member) 180 is supplied over a signal line 181 with a temperature signal $\theta_1$ of the coolant gas leaving the zone I and over a signal line 182 with a temperature signal $\bar{\theta}$ of the mean value of the outlet temperature $\theta_1, \theta_2, \theta_3, \theta_4$, of the four zones I, II, III and IV. The output of the PI member 180 acts on a second PI member 183 supplied, in addition, over a signal line 184 with a signal of the pressure of the live steam $p_D$ and over a signal line 185 with a signal of the desired value of the live steam pressure $p_S$. The output of the PI member acts on a proportional member (P member) 186 which receives, in addition, over a signal line 187, a signal $\dot{m}_D$ of the live steam mass flow of the power plant and, over a signal line 188, a signal representing the actual overall output of the nuclear reactor. Contrary to the other examples described, the output signal of the P member 186 is fed to a log member 189. The log signal is then fed to a limit member 190 and, following amplification in an amplifier 191, to an actuator 192. A pinion 193 of the actuator mates with a rack 194 carrying a control rod 195 (representative of an assembly of control rods) immerged in the zone I of a nuclear reactor 196. A neutron flux monitor 200 mainly irradiated by the zone I acts over a signal transmitter 201 on a distributor 202 from which the signal is fed, on the one hand, to a proportional member (P member) 203 and, on the other, to a log member 204. The output signal of the log member 204 is supplied over a distributor point 205 on the one hand to a limit member 190 into which it is fed in negatively and, on the other, to a differentiating member 206. The output signal of said differentiating member is fed negatively into the amplifier 191. Corresponding to the signal $\Phi_1$ of the neutron flux monitor 200 of the zone I, other corresponding signals $\Phi_2, \Phi_3, \Phi_4$, of the zones II, III, and IV are superimposed on the P member 203 so that the output signal of the P member 203 represents the overall neutron flux of the nuclear reactor. In view of the fact that this measured value may deviate from the actual value of the overall neutron flux, a particular control circuit is used for the correcting of the error. This control circuit consists of a multiplication member 207, a branch 208, comparator point 209 and an integrator 210. The comparator point 209 is supplied with a signal of an output measurement value that can be accurately determined, for instance, the signal of the thermal output of the power plant represented by a measuring value of the live steam mass flow. This signal supplied by a transmitter 211 is compared with a signal originating from the branch 208 which is to represent the corrected actual output of the nuclear reactor. The error signal resulting from the comparison is fed into the integrator 210 the output of which acts on the multiplication member 207 and represents there a multiplication factor. The integrator 210 reacts very slowly so that brief transitory deviations of the live steam mass flow $m_A$ with respect to the overall neutron flux $\Phi$ cause practically no change in the multiplication factor. It is the object of the interpolating of the differentiating member 206 to attenuate the speed of the neutron flux change. The limiting member 190 suppresses excessive, leaplike changes in the output of the nuclear reactor.

Although the invention has been described with respect to a nuclear reactor plant with a gaseous reactor coolant and a related steam power plant it is understood that it can likewise be used with a nuclear reactor plant using other coolants and other operating media.

The invention eliminates, without any drawback with regard to control quality or neutron flux asymmetry, the need for control rods with different control functions, which is advantageous since every control calls for a control range that must extend to either side of the mean position of the control rods. Thus, if several control rods are applied, a greater number of control rods must be immerged which, however, absorb neutrons in this position.

What is claimed is:

1. A control system for controlling a nuclear reactor power plant having a plurality of neutron-absorbing control rods arranged in a number of zones of a reactor and adjustment means for moving said rods into and out of said zones; said control system comprising first measuring means for measuring the power of each zone, second measuring means for measuring the total power of the reactor and control means connected to each of said first measuring means and said second measuring means for recording of the measured power of each zone and of the reactor and for producing an error signal in response to a deviation of the measured power of a zone or the reactor from a predetermined value, each said control means being connected to a respective one of said adjustment means to actuate said adjustment means in response to the production of an error signal whereby upon production of an error signal due to a deviation in total reactor power each said adjustment means is actuated to move said control rods identically and simultaneously and upon production of an error signal due to a deviation in zone power in one of said zones, said adjustment means of said one zone is actuated to move said control rods of said one zone identically and simultaneously independently of the remainder of said zones.

2. A control system as set forth in claim 1 wherein each zone has a coolant passing therethrough and said first measuring means includes means to measure the temperature of the coolant passing through each zone.

3. A control system as set forth in claim 1 wherein said first measuring means includes means to measure the neutron flux in each zone.

4. A control system as set forth in claim 3 wherein each zone has a coolant passing therethrough and said first measuring means further includes means to measure the temperature of the coolant passing through each zone.

5. A control system as set forth in claim 1 wherein each zone has a coolant passing therethrough and an outlet-connecting branch line for passage of the coolant from said zone, and wherein said first measuring means includes means to measure the temperature of the reactor coolant in said outlet-connecting branch.

6. A control system as set forth in claim 5 further comprises means for determining the mean value of the measured temperature of said zones and a control loop means connected to said means for determining the mean value for controlling the mass flow of coolant through said zones to maintain the mean value constant.

7. A control system as set forth in claim 1 wherein the nuclear power plant includes a steam-generating plant, and which further comprises a second control means for controlling the total power of said reactor in dependence upon the power need of said steam-generating plant, said second control means effecting a zero corrective action upon s simultaneous change in steam-generating plant power need and an equivalent change in total reactor power.

8. A control system as set forth in claim 1 wherein each zone is prismatic in shape.

9. A control system as set forth in claim 1 wherein said reactor comprises two groups of said zones arranged in tiered relationship.

* * * * *

UNITED STATES PATENT OFFICE
CERTIFICATE OF CORRECTION

Patent No. 3,625,815     Dated December 7, 1971

Inventor(s)   Ygal Fishman

It is certified that error appears in the above-identified patent and that said Letters Patent are hereby corrected as shown below:

Column 2, line 43, change "3" to -- $\vartheta_3$ --

Column 3, line 14, change "II" to --III--

Column 4, line 54, after "The effective" insert
--areas 71b', 71c' and 71d' of the respective piston sections 71b, 71c and 71d are identical in size and jointly form an area identical to the effective area 71a' of the piston section 71a so that with identical zone temperatures, i.e. if $\vartheta_1 = \vartheta_2 = \vartheta_3 = \vartheta_4$ the servo-piston 71 of the pilot 70 is in its rest position. In this rest position the two servo-pistons 71e and 71f close the orifices 72 and 73 of the lines 74 and 75 to the actuator 76. Therefore, none of the control oil maintained under pressure by means of a pump 77 in the space 78 of the pilot 70 can bypass into the actuator 76; consequently, the piston 105 remains in its rest position.--

Column 4, line 55, after "The" insert --various--

Column 5, line 14, change "14" to --114--

Column 5, line 60, change "carried" to --carries--

Column 8, line 63, change "s" to --a--

Signed and sealed this 30th day of May 1972.

(SEAL)
Attest:

EDWARD M. FLETCHER, JR.
Attesting Officer

ROBERT GOTTSCHALK
Commissioner of Patents